May 16, 1933.  P. S. CARTER  1,909,610
ELECTRIC CIRCUIT
Filed March 12, 1930
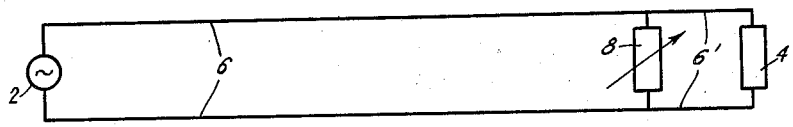
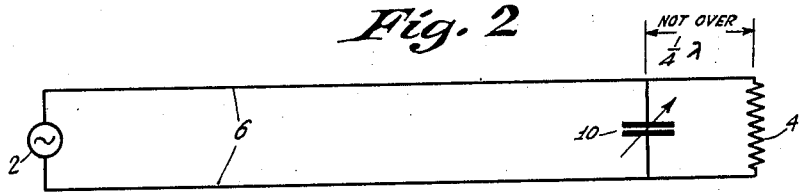
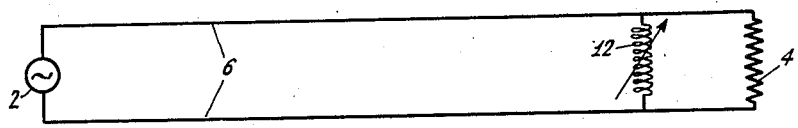
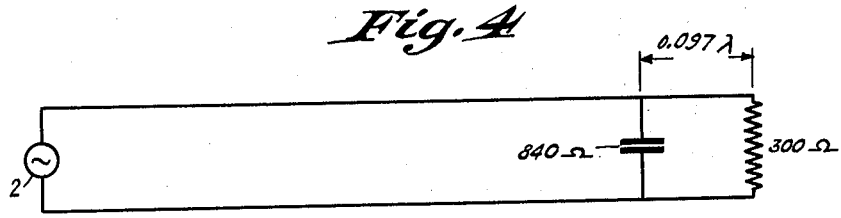
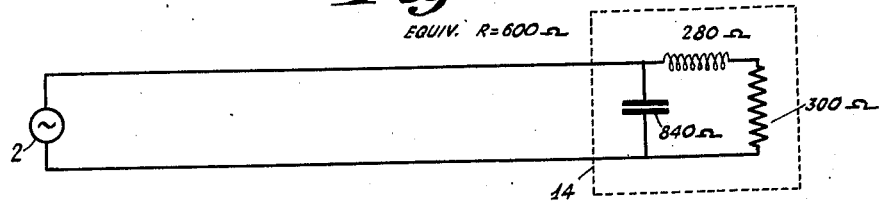
INVENTOR
PHILIP S. CARTER
BY
ATTORNEY Patented May 16, 1933

1,909,610

UNITED STATES PATENT OFFICE

PHILIP STAATS CARTER, OF PORT JEFFERSON, NEW YORK, ASSIGNOR TO RADIO CORPORATION OF AMERICA, A CORPORATION OF DELAWARE

ELECTRIC CIRCUIT

Application filed March 12, 1930. Serial No. 435,381.

This invention relates to electric circuits and especially to a transmission line supplying high frequency currents to a high frequency load circuit. In order that the line transmit energy at best efficiency; that is to say, without reflection, it is desirable that the line be terminated by a load which equals in impedance the surge impedance of the line. As lines and loads are independently designed; or, as it often occurs that existing lines must be connected with existing loads which do not have the requisite values of impedance for best energy transmission over the lines, it is an object of my invention to provide a method and means for terminating a line to which a load is connected so that the termination means combined with the load presents the correct impedance to the line. More specifically, I accomplish this by connecting a variable reactance across the line at a distance away from the load such that the circuit formed thereby including the variable reactance, the line portion between it and the load, and the load, presents an impedance equivalent to the surge impedance of the line.

In a case wherein the surge impedance is greater than the load impedance or resistance, I have discovered that by connecting a capacitive reactance across the line at a distance not more than one-quarter of a wave length of the energy transmitted by the line away from the load; or, by connecting an inductive reactance across the line at a distance more than one-quarter wave length but less than one-half wave length of the load, the combination of the reactance, load and portion of the line included between the reactance and the load becomes equivalent, with proper quantitative values of the electrical elements involved to the surge impedance of the line, therby facilitating efficient energy transmission.

Similarly I have discovered that when the surge impedance of the line is less than the load impedance, by connecting an inductive reactance across the line not more than one-quarter wave length away from it; or, a capacitive reactance across the line more than one-quarter wave length but less than one-half wave length away from the load, that the combination of reactance, load and portion of the line included between the reactance and the load becomes equivalent, with proper quantitative values of the electrical elements involved to the surge impedance of the line thereby properly terminating it for maximum energy transmission. Similar results can, of course, be obtained if multiples of the distances given are chosen. Thus, for example, where the surge impedance is greater than the load resistance, a capacity reactance may be connected across the line at a distance away from the load not over three-quarters and more than one-half wave length away from the load and the reactance plus the portion of the line included between it and the load together with the load will provide for the line an impedance equivalent to its surge impedance.

Although I have defined my invention in particularity in the appended claims, it may best be understood by referring to the accompanying drawing in which Figure 1 generically discloses my invention for properly terminating the line so that the load plus the terminating circuit equals the surge impedance of the line, Figure 2 illustrates a terminating arrangement wherein the load resistance is less than the surge impedance; or, in other words where the surge impedance is greater than the load impedance, Figure 3 illustrates an arrangement for properly terminating a line wherein the load resistance is greater than the surge impedance of the line, Figure 4 illustrates the actual constants used to properly terminate a line of 600 ohms surge impedance when the load thereacross is 300 ohms, and Figure 5 illustrates the equivalent lumped electrical circuit of Figure 4.

Turning to Figure 1, a source of alternating energy 2 feeds energy to a load impedance 4 through the intermediary of the transmission line 6. In order that energy may be conveyed at maximum efficiency along the line 6, the surge impedance of line 6 should be equal in value to the impedance of load 4. In practice, as already indicated, it rarely occurs that the load has the correct impedance value so as to match the surge impedance of the line to which it is connected. In order to properly match the load and line, according to my invention, I connect across the line at suitable distance away from the load a variable reactance 8 of such a value and at such a distance away from the load 4 that the reactance 8, the load 4 and the portion 6' of the line 6 included therebetween, equals in value the surge impedance of the line, thereby allowing of most efficient energy transfer from source 2 along the line 6.

In the case where the surge impedance is greater than the load impedance or load resistance, by connecting a capacitive reactance 10 such as shown in Figure 2 across the transmission line 6 at a distance away from the load not more than one-quarter wave length of the energy derived from source 2 and transmitted along line 6, the combination of the capacitive reactance 10 and the portion of the line 6 between it and the load resistance 4 will so terminate the line that it faces an impedance equivalent to its surge impedance. The same result is obtained by connecting an inductive reactance across the line at a distance away from the load 4 not over one-half wave length and not less than one-quarter wave length. Again, the same result, where the surge impedance of the line is greater than the load resistance, is obtained by connecting a capacitive reactance across the line at a distance away from the load between three-quarter and one-half wave length; etc. I prefer, however, to use as small a section of the line as possible in order to properly terminate it.

In the event that the surge impedance is less than the load resistance, proper line termination is obtained by connecting an inductive reactance 12, as shown in Figure 3, at a distance away from the load resistance not over one-quarter wave length of the energy transmitted by the two wire transmission line 6. The same result is obtained by connecting in Figure 3, in place of inductance 12 a variable capacitive reactance (it is to be understood, of course, that all of the reactances so far mentioned may be variable as indicated on the drawing) between one-half wave length and one-quarter wave length away from the load 4. Similarly, the same result can be obtained by connecting an inductive reactance across the line between three-quarter and one-half wave length away from the load resistance 4; etc. However, as I have stated with reference to the invention as disclosed in Figure 2, I prefer to connect a suitable reactance across the line as closely as possible to the load so as to include a minimum section of the line between the reactance and the load.

In Figure 4, I have shown the actual values of the elements involved where a line having a surge impedance of 600 ohms supplies a load of 300 ohms. In order to properly terminate a line a capacitive reactance of 840 ohms with respect to the frequency of the radio frequency energy being conducted parallels the load at a distance of 0.097 of the wave length employed.

In Figure 5 the equivalent electrical circuit 14 is disclosed and it is shown that the portion of the line included between the capacitive reactance and the load is equivalent to a lumped inductive reactance of 280 ohms.

In order to fix more clearly in mind the line sections and reactances to be used for properly terminating a line so that it faces an impedance equivalent to its surge impedance, the following table, which is self explanatory, wherein $Z_o$ indicates the surge impedance of the line, is given.

| Load resistance. | Line section length. | Reactance necessary to match line. |
|---|---|---|
| Less than $Z_o$ | Less than ¼ W. L. | Capacity. |
| Greater than $Z_o$ | Less than ¼ W. L. | Inductance. |
| Less than $Z_o$ | Greater than ¼ but less than ½ W. L. | Inductance. |
| Greater than $Z_o$ | Greater than ¼ but less than ½ W. L. | Capacity. |

What I claim is:

1. In combination, a source of energy, a load, a transmission line extending between said source of energy and said load, means for matching said load to the surge impedance of said line consisting of a reactance connected across said line between said load and said source and so arranged that a portion of said line is located between said reactance and load, said reactance having such value that the combination only of the load, portion of the line, and the reactance becomes equivalent to the surge impedance of said transmission line.

2. A combination as defined in claim 1 characterized in this, that said reactance comprises a variable element, and said transmission line comprises an unbroken, linear connection characterized by the absence of serially connected impedances between said source and said load.

3. In combination, a source of energy, a load having a predetermined resistance, a transmission line extending between said source of energy and said load and having a surge impedance greater than the load resistance, a capacitive reactance connected across said line between said load and said source and so arranged that a portion of said line not exceeding a quarter wave length is located between said reactance and said load for matching said load to the surge impedance of said line, said capacitive reactance having such value that the combination only of the load, portion of the line, and the reactance becomes equivalent to the impedance of said transmission line.

4. In combination, a source of energy, a load having a predetermined resistance, a transmission line extending between said source of energy and said load and having a surge impedance greater than the load resistance, an inductive reactance connected across said line between said load and said source and so arranged that a portion of said line between one quarter and one half wave length is located between said reactance and load, said inductive reactance having such value that the combination only of the load, portion of the line, and the reactance becomes equivalent to the surge impedance of said transmission line.

5. In combination, a source of energy, a load having a predetermined resistance, a transmission line extending between said source of energy and said load and having a surge impedance less than the load resistance, an inductive reactance connected across said line between said load and said source and so arranged that a portion of said line less than one quarter wave length is located between said reactance and said load for matching said load resistance to the surge impedance of said line, said inductive reactance having such value that the combination only of the load, portion of the line, and the reactance becomes equivalent to the surge impedance of said transmission line.

PHILIP STAATS CARTER.